Aug. 17, 1971   Z. STACHURSKI ET AL   3,600,230

GAS-DEPOLARIZED CELL WITH HYDROPHOBIC-RESIN-CONTAINING CATHODE

Original Filed Feb. 3, 1966

INVENTORS:
ZBIGNIEW STACHURSKI
RENATO DI PASQUALE
BY: Stephen W. Delyea
ATTORNEY

United States Patent Office

3,600,230
Patented Aug. 17, 1971

3,600,230
GAS-DEPOLARIZED CELL WITH HYDROPHOBIC-RESIN-CONTAINING CATHODE
Zbigniew Stachurski, New York, N.Y., and Renato Di Pasquale, Paramus, N.J., assignors to Yardney International Corp., New York, N.Y.
Continuation of application Ser. No. 524,927, Feb. 3, 1966. This application Sept. 22, 1969, Ser. No. 860,098
Int. Cl. H01m 29/04, 13/00
U.S. Cl. 136—86                                     8 Claims

ABSTRACT OF THE DISCLOSURE

A gas electrode for use in a gas-depolarizable current-generating cell comprises a unitary structure formed of (1) a conductive apertured current-collecting member, i.e. a metallic grid or screen, (2) a porous conductive layer consisting of a hydrophobic resinous material and a network of conductive material in fibrous form in intimate contact with one surface of the apertured current-collecting member, and (3) a porous catalytically active layer, consisting of a hydrophobic resinous material containing particles of catalytically active material dispersed therein, in intimate contact with the outer surface of the hydrophobic conductive layer.

---

This application is a continuation of application Ser. No. 524,927 filed Feb. 3, 1966, now abandoned.

Our present invention relates to electrochemical generators of the so-called gas-depolarizable and fuel-cell types and in particular to a gas electrode which can be incorporated into such cells for operation at substantially atmospheric pressure.

To be practical and effective, the gas electrode must be sufficiently porous to permit access of the gas to the reaction sites and yet possess sufficient mechanical strength to withstand the stresses to which it is subjected during the construction and operation of the cell. The portions of the electrode surface at which the reaction takes place must have a substantial area and be active catalytically. To minimize the internal resistance, the electrode may be provided with a metallic current-collecting member and low-resistance conductive paths should exist between the reaction sites and such member. Furthermore, the electrode should be provided with a hydrophobic layer on the gas side to prevent electrolyte flooding of the electrode pores with the attendant disappearance of active interface.

It has been proposed heretofore to fulfill these various requirements by using a so-called two-layer type of gas electrode consisting of a relatively thick layer on the electrolyte side and a thin hydrophobic film on the gas side. In accordance with the above suggestion, the relatively thick layer consists of a mixture of Teflon and catalyst material pressed and sintered onto a conductive supporting screen and covered on the gas side with a thin layer of porous non-conductive Teflon.

Electrodes made in this fashion, however, suffer principally from the fact that the conductivity of the Teflon-catalyst layer is not sufficient to provide the low internal resistance necessary to operate the cell at the current densities required in many applications. Furthermore, costly catalytic material is distributed throughout most of the electrode thickness instead of being limited to the active interface region.

It is therefore an object of the present invention to provide a gas electrode having improved conductivity and low internal resistance.

It is a further object to provide a porous gas electrode having improved conductivity from the reaction sites to the current-collecting member.

A further object is to provide a gas electrode having increased effectiveness of the catalytic material, thus resulting in reduced cost.

Still a further object is to provide a cell of the gas-depolarized or fuel-cell type capable of operating to provide higher currents at higher useful voltages, thus achieving higher power densities.

Other and more detailed objects will be apparent by reference to the following description and examples illustrating the present invention, given with reference to the accompanying drawing in which.

Figure 1:
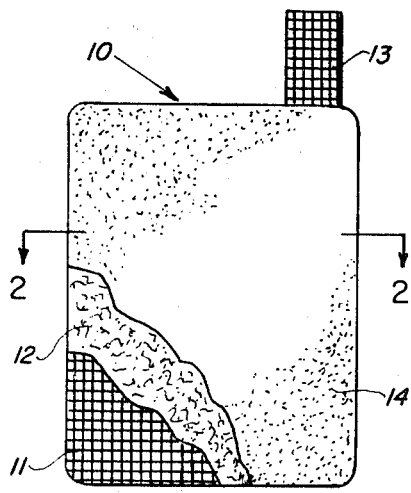
FIG. 1 is an elevational view partly in section of a gas electrode embodying the present invention.
Figure 2:
FIG. 2 is a cross-sectional view taken along line 2—2 of FIG. 1.

In FIGS. 1 and 2 there is shown a gas electrode 10 having an apertured metallic member 11, such as a grid, screen or perforated plate, on the gas side combined with a porous, resinous, conductive layer 12. The member 11 is provided with an outwardly extending connector tab 13. The outer surface of this conductive layer carries a porous resinous active layer 14.

The conductive layer 12 comprises a fused matrix of a hydrophobic resin such as polytetrafluoroethylene and a fiber-like conductive network (FIG. 3) of a catalytically inactive metal such as silver therein.

The apertured metallic member 11 imbedded in the conductive layer 12 acts as a support and current collector. It may be a grid, screen, mesh, perforated plate, or the like, made of any suitable metal such as silver, nickel, or nickel-plated copper.

The catalytically active electrolyte-contacting layer 14 is a porous conductive body comprising a fused matrix of a hydrophobic resin which may be similar to that present in conductive layer 12 and containing dispersed therein particles of a catalytic material such as platinum or silver.

Figure 3:
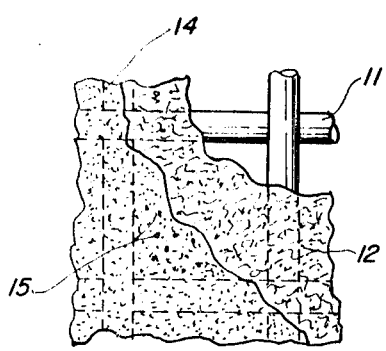
FIG. 3 is an enlarged top plan view, partially in cross section, of part of the electrode plate illustrated in FIG. 1.

As is evident from FIGS. 2 and 3, the gas electrode of the present invention provides a porous, conductive catalytically active layer combined with a hydrophobic, highly conductive layer. The fiber-like network of metal provides readily available, highly conductive paths for the flow of current from the reaction sites in the catalytic active layer to the current-collecting member, thus providing an electrode structure having low internal resistance and consequently a low voltage drop across the electrode structure.

Obviously, the conductive layer of the present invention may comprise various hydrophobic resinous materials and filamentary metal networks. Furthermore, various methods may be used in preparing the conductive layer including, among others, mixing extremely fine metal fibers with resin particles and fusing, or impregnating fine metal webs with resin and fusing.

However, we have found that, in general, a particularly efficient and inexpensive method of preparation comprises the steps of impregnating a fibrous thermally decomposable sheet or web with a solution of a soluble metal salt and connecting said salt to the elemental metal or to a form which is thermally decomposable to the metal. One method is to treat the soluble salt with alkali, precipitating the hydroxide, and then thermally decomposing the latter after a washing to remove residual alkali. The metal-compound-impregnated sheet in next treated with a suspension of hydrophobic resin particles such as polytetrafluoroethylene and dried.

The thus treated and impregnated fibrous sheet is then heated at a temperature and for a time sufficient to pyrolyze the fibrous sheet and thermally decompose the metal compound to elementary metal, and to fuse the resin particles, thus providing a porous, hydrophobic conductive layer comprising principally hydrophobic resin and a fiber-like conductive metal network. Depending on the choice of the fibrous sheet and the temperature and time used for fusion, carbonized particles or fibers may also be present in the conductive layer.

Following the formation of the fused, porous resinous film, it is combined with an open metallic member, such as a screen, by the simultaneous application of heat and pressure.

The catalytically active layer is made by preparing a mixture having paste-like consistency from particles of a catalytic material, such as platinum black, and particles of hydrophobic resin and water. The paste-like mixture is uniformly applied to the outer surface of the conductive layer by any known method, for example, by spreading with a spatula or a doctor blade. Following the application of the paste, the electrode structure is dried and hot-pressed to give the desired thickness.

In preparing the electrode of this invention, the catalytic material may be selected from the group consisting of silver, platinum and activated carbon. Of particular interest is an active layer wherein the catalytic material is a mixture of carbon and fine silver particles.

Figure 4:
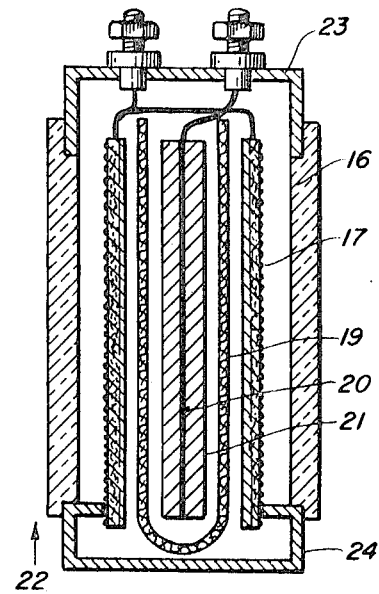
FIG. 4 is a representation in cross-section of a gas-depolarized cell embodying a gas electrode in accordance with the present invention.

It has been discovered that when silver and carbon are mixed in the range of 1:1 to 4:1 and preferably 2:1 parts of silver to carbon, a synergistic effect occurs with a resultant 20–30% increase in current for the same voltage over that for silver alone when incorporated in a cell using a 2-inch anode as illustrated in FIG. 4.

The synergistic effect is due to the fact that carbon particles are dispersed between the silver particles and consequently the agglomeration of active particles of silver is greatly hindered. This is particularly important for operation at elevated temperature, whether such elevation arises from ambient conditions or from heat generated during operation. Under such conditions, the rate of agglomeration is particularly great and silver alone rapidly loses its activity. In the presence of carbon, suitably dispersed and blended with the silver, the rate is reduced and becomes negligibly low for most purposes.

The representation illustrated in FIG. 3 clearly shows the advantages resulting from the preferred embodiment of the present invention. The void space 15 outlined by the mesh elements of current collector member 11 of a gas electrode must be covered by an electrolyte-proof protective member to prevent electrolyte flooding through to the gas side of the electrode and rendering it inactive. In the past, this was accomplished by filling and covering the void space with hydrophobic resinous containing particles of catalytic material or by covering the void space with a hydrophic resinous material upon which was placed the catalytic material in a resinous carrier. However, as can be easily visualized, in such prior practices the conductive paths from the individual catalytically reactive particle sites to the collector member were tortuous and oftentimes nonexistent. In contrast, by providing the conductive layer of the present invention as shown at 12 of FIG. 3, we facilitate the flow of current from any of the individual catalytically reactive particle sites along the filamentary metal network to the mesh elements of the current-collecting member.

An example of a preferred embodiment of the electrode structure of the present invention and its use in a typical gas-depolarizable cell is illustrated in FIG. 4 wherein a cell comprises a case having a base 24, two parallel solid sidewalls not visible in the drawing, two walls made of a series of spaced ribs 16 defining openings therebetween, and a cover 23, all of polystyrene, polymethylmethacrylate or other suitable chemically inert material.

Disposed in the center of the case, parallel to the two ribbed apertured sides, is an anode 21 made of electrochemically active oxidizable metal such as zinc, cadmium, magnesium or aluminum. The anode is wrapped in a porous separator 19. An air electrode 17 made in the manner described hereinbefore is disposed adjacent each apertured wall, parallel to the anode, with the catalytically active layer 14 of both electrodes facing the separator. Plastic ribs 16 compress the electrode assembly and provide free access to the air electrode. The cell is filled with a suitable electrolyte which may be a 31% solution of potassium hydroxide where the anode is of zinc. For a magnesium anode, a perchlorate solution may be preferred.

The gas electrodes were made by impregnating sheets of high-alpha-cellulose paper with a 15% by weight solution of silver nitrate, followed by treating in a 44% solution of potassium hydroxide for one minute. After washing to neutrality and drying, the silver-impregnated paper was treated with an emulsion of polytetrafluoroethylene resin and dried. The resin-treated silver-impregnated sheet was then sintered in an oven at a temperature of 360° C. for 45 minutes to thermally decompose the silver salt, pyrolyze the alpha-cellulose paper and fuse the resin particles to form layer 12.

The resin-silver sheet was then combined with a nickel mesh cloth 11 by pressing together at 3000 p.s.i. for 15 minutes and at a temperature of 750° F. Preferably, the nickel mesh cloth is brushed or dip coated with a polytetrafluoroethylene resin emulsion and dried prior to combining with the resin-silver sheet to insure maximum adherence between the mesh and the sheet material.

A paste consisting of 2 parts of magnesium-reduced silver containing up to 1% residual magnesium, 1 part carbon black, 1 part polytetrafluoroethylene resin and 7½ parts of water was uniformly spread on the outer electrolyte-contacting surface of the conductive layer and dried, followed by pressing at 3000 p.s.i. at a temperature of 580° F. for 50 seconds to provide a layered gas-electrode structure in accordance with the present invention having a thickness of .010 inch.

It has been discovered that magnesium-reduced silver containing a small amount of magnesium, up to 1%, has a greater catalytic effect and provides higher currents than similarly reduced silver containing no residual magnesium.

In a manner essentially similar to the above, active layers can be prepared by using pastes wherein other catalytic material, such as platinum, is used in place of the silver-carbon mixture. As is obvious, however, preparation of the platinum catalyst per se will differ from the preparation of the silver catalyst.

When supplied with air at atmospheric pressure and room temperature, the performance of the active cell pack (exclusive of case) expressed in watt-hours per pound and watt-hours per cubic inch was 150 and 7.5 respectively.

In general, the fibrous web used in providing the conductive layer will have a thickness in the range of .001 to .005 inch with a preferred thickness of .0035 inch. The current-collector member will have a thickness in the range of .003 to .010 inch. The overall thickness of the electrode structure may vary considerably, depending upon the particular requirements of the cell system, but in general will be in the range of .004 to .030 inch.

When electrodes are prepared by the above-described method, the conductive layer will have a porosity in the range of 50 to 85%, while the porosity of the active layer will be in the range of 40 to 75%.

Under certain conditions where the cell must discharge at high rates or where it must be operable at temperatures above room temperature, it has been found advantageous to place a semi-permeable wettable membrane adjacent the outer side of the active layer. Such a membrane decreases the rate at which electrolyte penetrates to the gas side of the electrode and prevents excess liquid electrolyte from entering the active layer. When operating air/zinc cells, as described above and as shown in FIG. 4, at a temperature of 60° C., the use of the wettable member provided a 20–50% increase in capacity over similar cells without the membrane.

Whereas the invention has been described with reference to specific forms thereof, it will be understood that many changes and modifications thereof may be made without departing from the spirit of this invention.

I claim:

1. In a gas-depolarized cell comprising at least one consumable metal anode, a liquid electrolyte and at least one gas-depolarized cathode provided with a gas-contacting side and an electrolyte-contacting side, the improvement wherein the cathode comprises superimposed layers of
    (a) a metallic conductive supporting grid on the gas-contacting side,
    (b) an intermediate matrix of hydrophobic resin containing conductive material in fibrous form distributed therethrough to form conductive paths through said intermediate layer, and
    (c) a hydrophobic-resin matrix containing catalytically-active material distributed therethrough on the electrolyte-contacting side.

2. The improvement according to claim 1 wherein the conductive material in fibrous form is silver metal.

3. The improvement according to claim 1 wherein the catalytically active material is selected from the group consisting of activated silver, platinum-group metals, activated carbon and combinations thereof.

4. The improvement according to claim 3 wherein the catalytically active material is a mixture of silver and carbon in the range of 1:1 to 1:4 parts of silver to carbon.

5. The improvement according to claim 3 wherein the activated silver is a magnesium-reduced silver containing not more than 1% residual magnesium.

6. The improvement according to claim 1 wherein the hydrophobic resin is polytetrafluorethylene.

7. The improvement according to claim 1 wherein the gas-depolarized cathode has a thickness in the range of 0.004 to 0.030 inch.

8. The improvement according to claim 1 wherein the gas-depolarized cathode has a thickness of about 0.01 inch.

References Cited

UNITED STATES PATENTS

| | | | |
|---|---|---|---|
| 3,436,270 | 4/1969 | Oswin et al. | 136—86 |
| 3,438,815 | 4/1969 | Gine | 136—86 |
| 3,457,113 | 7/1969 | Deibert | 136—86 |
| 3,467,552 | 9/1969 | Gine | 136—86 |

ALLEN B. CURTIS, Primary Examiner

U.S. Cl. X.R.

136—120